Figure 14:
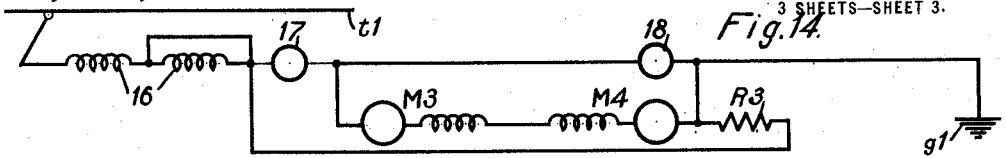

R. E. HELLMUND.
CONTROL SYSTEM.
APPLICATION FILED SEPT. 27, 1916.
1,393,442. Patented Oct. 11, 1921.
3 SHEETS—SHEET 1.
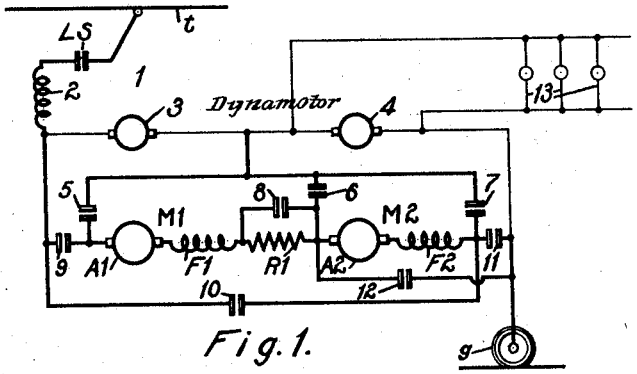
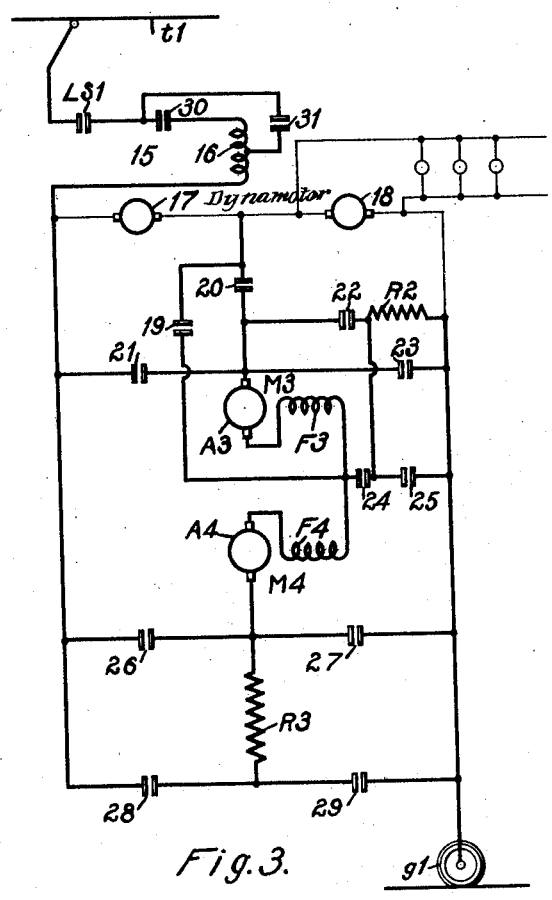
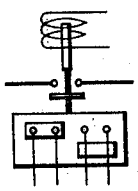
INVENTOR
Rudolf E. Hellmund.
BY
ATTORNEY
WITNESSES:

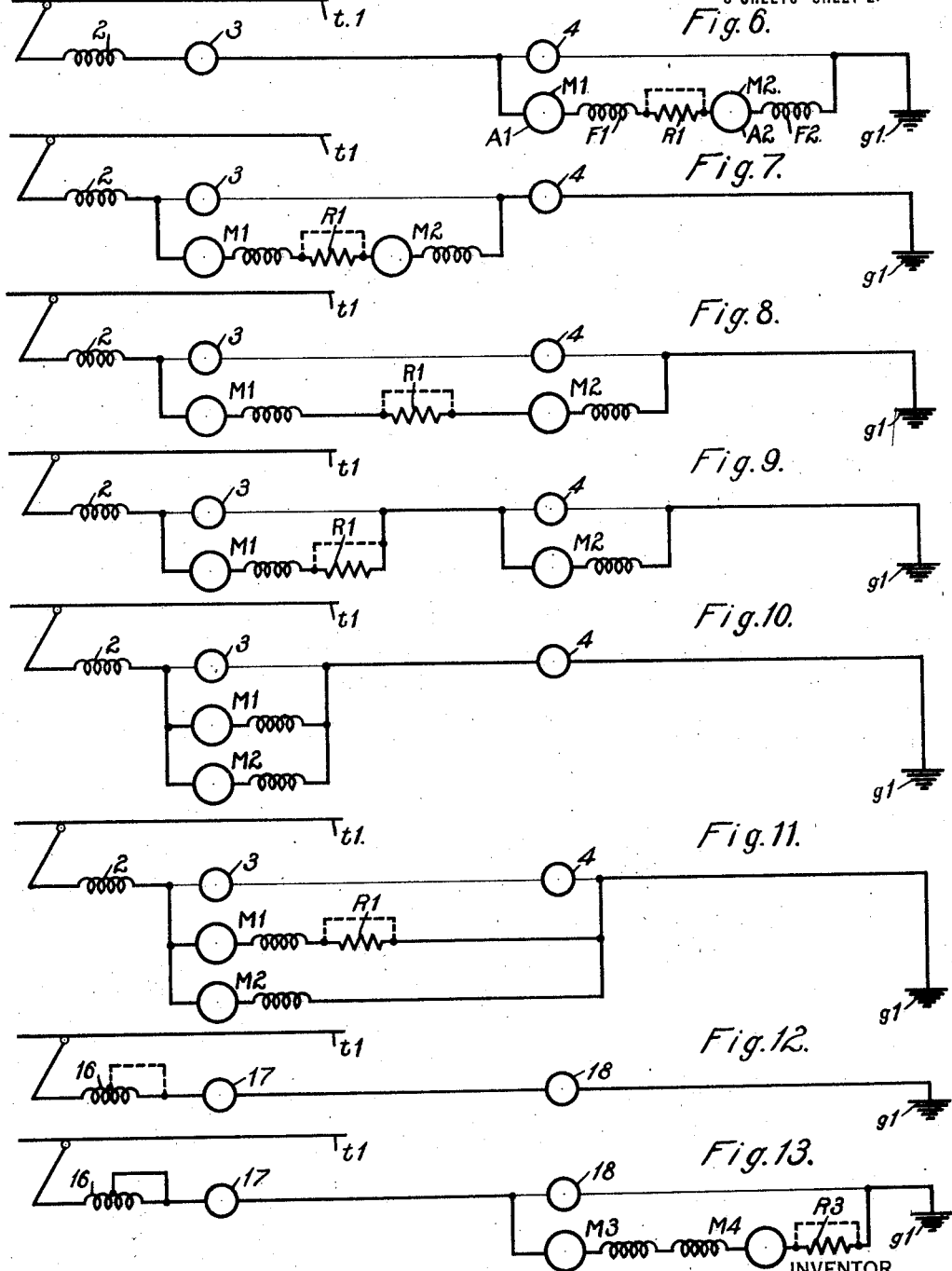

R. E. HELLMUND.
CONTROL SYSTEM.
APPLICATION FILED SEPT. 27, 1916.

1,393,442. Patented Oct. 11, 1921.
3 SHEETS—SHEET 3.

WITNESSES:
R.J. Fitzgerald
W.R. Coley

INVENTOR
Rudolf E. Hellmund.
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,393,442.  Specification of Letters Patent.  Patented Oct. 11, 1921.

Application filed September 27, 1916. Serial No. 122,375.

*To all whom it may concern:*

Be it known that I, RUDOLF E. HELLMUND, a subject of the German Emperor, and a resident of Swissvale, in the county of Allegheny and State of Pennsylvania, have invented a new and useful Improvement in Control Systems, of which the following is a specification.

My invention relates to systems of control and particularly to systems of control for governing the operation of the propelling motors of electric vehicles.

One object of my invention provides a system of the above indicated character that shall effect the acceleration of the motors contained therein in an efficient and uniform manner.

Another object of my invention is to provide a control system of the above indicated class wherein the usual accelerating resistance losses are obviated to a material degree.

More specifically, my invention embodies a dynamotor, comprising field windings and armature windings, which is connected across a supply circuit and which is adapted to generate energy for accelerating a number of motors. Switches and circuit connections are provided for connecting the motors in series and in parallel relation across the armature windings of the dynamotor and in various circuit relations across the supply circuit.

In the accompanying drawings, Figure 1 is a diagrammatic view of a system of control embodying my invention; Fig. 2 is a control chart illustrating the sequence of operation of the switches illustrated in Fig. 1; Fig. 3 is a diagrammatic view of a modification of my invention; Fig. 4 is a control chart illustrating the sequence of operation of the switches illustrated in Fig. 3; Fig. 5 is a detail view of a switch that may be employed in the circuits illustrated in Figs. 1 and 3; Figs. 6 to 11, inclusive, are diagrammatic views of the circuits formed through the motors of the system illustrated in Fig. 1; and Figs. 12 to 21, inclusive, are diagrammatic views of the circuits formed through the motors of the system illustrated in Fig. 3.

Referring to Fig. 1 of the drawings, a dynamotor 1, comprising a field winding 2 and armature windings 3 and 4, is adapted to be connected across a supply circuit comprising conductors $t$ and $g$ by means of a line switch LS. Two motors M1 and M2, respectively comprising armature windings A1 and A2 and field windings F1 and F2, are adapted to be connected in various circuit relations across the armature windings 3 and 4 and across the supply circuit by means of switches 5 to 12, inclusive. A plurality of lights 13 of the electric vehicle are adapted to be connected across the armature winding 4, and an accelerating resistor R1 is provided to be connected in circuit with the motors M1 and M2.

In Fig. 3 of the drawings, a dynamotor 15 comprising a field winding 16 and armature windings 17 and 18, is adapted to be connected across a supply circuit comprising conductors $t1$ and $g1$ by means of a line switch LS1. Two motors M3 and M4, respectively comprising armatures A3 and A4 and field windings F3 and F4 are adapted to be connected in circuit with the resistors R2 and R3 across the armature windings 17 and 18 in various circuit relations by means of switches 19 to 31, inclusive.

It is believed that a description of the main circuits illustrated in Figs. 1 and 3 in conjunction with the control charts illustrated in Figs. 2 and 4 and the circuit diagrams illustrated in Figs. 6 to 21, inclusive, will constitute a sufficient disclosure of my present invention. Accordingly, no governing systems with the usual controllers and interlock switches are illustrated.

Considering the system illustrated in Fig. 1 to be in the position shown, the acceleration of the motors M1 and M2 through positions $a$ to $k$, inclusive, may be as follows: in position $a$, switches LS, 5 and 11 are operated to connect the dynamotor 1 across the supply circuit and to connect the motors M1 and M2 across the armature winding 4 of the dynamotor. The circuit through the dynamotor 1 may be traced from the supply conductor $t$, through the line switch LS, field winding 2, armature winding 3, and armature winding 4 to the ground conductor $g$. The circuit through the motors M1 and M2 may be traced from one terminal of the winding 4, through the switch 5, armature A1, field winding F1, resistor R1, armature A2, field winding F2 and switch 11 to the other terminal of the armature winding 4. The motors M1 and M2 are thus connected in series across the armature winding 4, as is illustrated in Fig. 6 of the drawings, and in position $b$, the switch 8 is operated to exclude the resistor R1 from the circuit of the motors M1 and M2, as is illustrated by the dotted lines in Fig. 6 of the drawings.

In position $c$, the switches 5, 8 and 11 are released and the switches 7 and 9 are operated to complete a circuit through the motors M1 and M2, which may be traced from one terminal of the armature winding 3, through switch 9, motor M1, resistor R1, motor M2 and switch 7 to the other terminal of the armature winding 3. The motors M1 and M2 are thus connected in series with the resistor R1 across armature winding 3, as illustrated by the full lines in Fig. 7 of the drawings. In position $d$, the switch 8 is operated to exclude the resistor R1 from the circuit of the motors M1 and M2, as is illustrated by the dotted lines in Fig. 7. The motors M1 and M2 are accelerated by the change from the position across armature winding 4 to the position across the armature winding 3, by reason of the armature winding 3 being wound so as to generate a higher voltage than that generated by the armature winding 4.

In position $e$, the switches 7 and 8 are released and the switch 11 is operated to connect the motors M1 and M2 in parallel with the armature windings 3 and 4 across the supply conductors $t$ and $g$. The circuit through the motors M1 and M2 may be traced from the supply conductor $t$, through the line switch LS, field winding 2, switch 9, motor 1, resistor R1, motor 2 and the switch 11 to the ground conductor $g$, as is illustrated by full lines in Fig. 8 of the drawings. In position $f$, the switch 8 is operated to exclude the resistor R1 from the circuit of the motors M1 and M2, as is illustrated by the dotted lines in Fig. 8 of the drawings.

In the accelerating position $g$, the switch 8 is released and the switch 6 is operated to connect the motor M1 in series with the resistor R1 across the armature winding 3 and to connect the motor M2 across the armature winding 4, as is illustrated by the full lines in Fig. 9 of the drawings. In position $h$, the switch 8 is operated to exclude the resistor R1 from the circuit of the motor M1, as is illustrated by the dotted lines in Fig. 9 of the drawings.

In position $i$, the switch 11 is released and the switch 10 is operated to connect the motors M1 and M2 in parallel across the armature winding 3, as is illustrated in Fig. 10 of the drawings. In position $j$, the switches 6 and 8 are released and the switch 12 is operated to connect the motors M1 and M2 in parallel across the armature windings 3 and 4, the resistor R1 being included in the circuit of the motor M1, as is illustrated by the full lines in Fig. 11 of the drawings. In position $k$, the switch 8 is operated to exclude the resistor R1 from the circuit of the motor M1, as is illustrated by the dotted lines in Fig. 11 of the drawings.

Thus the motors M1 and M2 are accelerated through eleven successive steps and are connected in series across the armature winding 4 of low voltage, in series across armature winding 3, which generates a current of higher voltage, in series across the line circuit, in series parallel relation with the armature windings 3 and 4 across the line circuit, in parallel across the armature winding 3 and in parallel across the line circuit.

Referring to Fig. 3 of the drawings, the acceleration of the motors M3 and M4 through positions $a$ to $s$, inclusive, may be as follows: In position $a$, the dynamotor 15 is connected across the supply conductors $t$ and $g$ by means of the switches LS1 and 30. In position $b$, the switch 31 is operated to exclude a portion of the field winding 16 from the circuit of the dynamotor, and in position $c$, the switch 30 is released and a circuit is completed through the dynamotor 15, as is illustrated by the dotted lines in Fig. 12 of the drawings. The circuit to the dynamotor may be traced from the supply conductor $t1$, through the line switch LS1, switch 31, field winding 16, armature winding 17 and the armature winding 18 to the ground conductor $g1$.

The dynamotor 15 in Fig. 3 of the drawings is adapted to generate currents of unequal voltage by means of its armature windings 17 and 18. The armature winding 18 is adapted to generate a current having a voltage of 37 to 38 per cent. of the line voltage and the armature winding 17 is adapted to generate a current having a voltage of 62 to 63 per cent. of the full line voltage.

In position $d$, the switches 20 and 29 are operated to connect the motors M3 and M4 in series with the resistor R3 across the armature winding 18. The circuit through the motors M3 and M4 may be traced from one terminal of the armature winding 18, through the switch 20, motor M3, motor M4, resistor R3 and the switch 29 to the other terminal of the armature winding 18, as is diagrammatically illustrated by the full lines in Fig. 13 of the drawings. The voltage applied to the motors is thus somewhat less than one-quarter of the line voltage, since the voltage of armature winding 18 is about 37% of the line voltage, and the resistor R3 consumes a certain portion of the operating voltage. In position $e$, the switch 27 is operated and in position $f$, the switch 29 is released to exclude the resistor R3 from the circuit of the motors and complete a circuit, as is illustrated by the dotted lines in Fig. 13 of the drawings. The operating voltage is thus between one-quarter and one-half of the line voltage; or in other words, the full voltage of the armature winding 18. In position $g$, the switch 28 is operated to complete a circuit through the motors M3 and M4, as is illustrated in Fig. 14 of the drawings.

Figure 15:
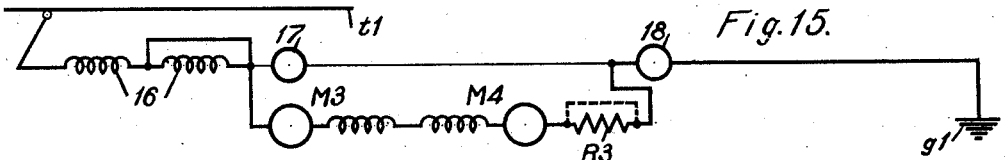

In position $h$, the switch 27 is released to connect the motors M3 and M4 in series with the resistor R3 across the armature winding 17, as is illustrated by the full lines in Fig. 15 of the drawings. The circuit through the motors M3 and M4 may be traced from one terminal of the armature winding 17 through the switch 28, resistor R3, motor M4, motor M3 and switch 20 to the other terminal of the armature winding 17. The voltage applied to the motors is thus about one-half of the line voltage; namely, the 63% voltage of the armature winding 17 minus the voltage consumed by the resistor R3. In position $i$, the switch 26 is operated and in position $j$, the switch 28 is released to exclude a resistor R3 from the circuit of the motors M3 and M4, as is illustrated by the dotted lines in Fig. 15 of the drawings. The operating voltage at this time is between one-half and full line voltage; that is to say, the full 63% voltage of the armature winding 17.

Figure 16:
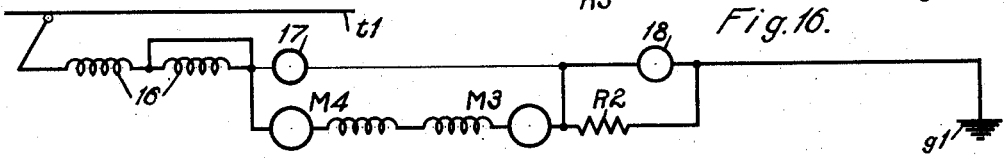
Figure 17:
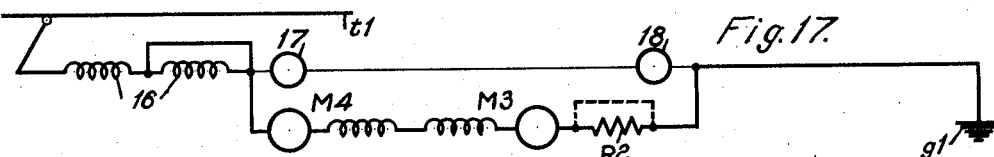

In position $k$, the switch 22 is operated to connect the motors M3 and M4 across the armature winding 17 and the resistor R2 across the armature winding 18, as is illustrated in Fig. 16 of the drawings. In position $k$, the armature winding 18 is short-circuited by the resistor R2, but as this is a transition position, no material damage is effected by reason of the short time the resistor R2 is connected across the armature winding. In position $l$, the switch 20 is released and the motors are connected in parallel with the armature windings 17 and 18 across the supply conductors $t1$ and $g1$ as illustrated in Fig. 17 of the drawings. The circuit through the motors M3 and M4 may be traced from the supply conducor $t1$, through the line switch LS1, switch 31, field winding 16, switch 26, motor M4, motor M3, switch 22 and the resistor R2 to the ground conductor $g1$. In position $m$, the switch 23 is operated to exclude the resistor R2 from the circuit of the motors M3 and M4, as is illustrated by the dotted lines in Fig. 17 of the drawings.

Figure 18:
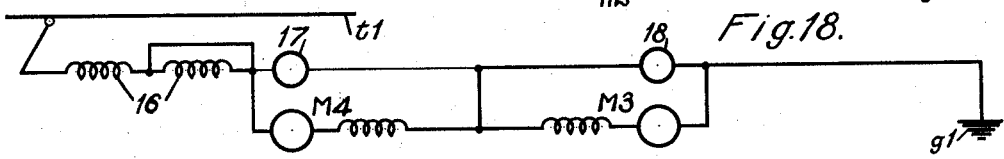

In position $n$, the switch 19 is operated to connect the motor M4 across the armature winding 17 and the motor M3 across the armature winding 18, as is illustrated in Fig. 18 of the drawings. In position $o$, the switches 22 and 23 are released to exclude the motor M3 from circuit and to connect the motor M4 across the armature winding 17.

Figure 19:
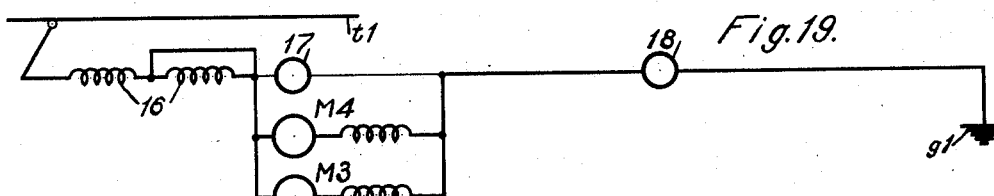

In position $p$, the switch 21 is operated and the two motors M3 and M4 are connected in parallel across the armature winding 17, as is illustrated in Fig. 19 of the drawings.

Figure 20:
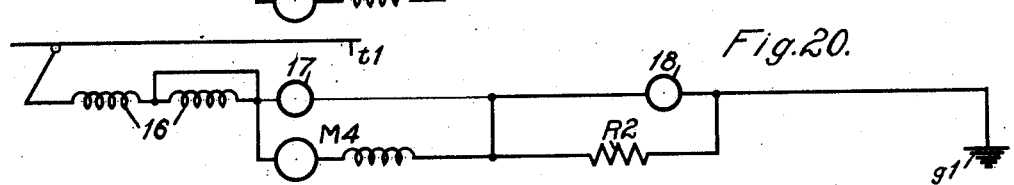

In position $q$, the switch 24 is operated to connect the motor M4 across the field winding 17 and the resistor R2 across the armature winding 18, as is illustrated in Fig. 20 of the drawings.

Figure 21:
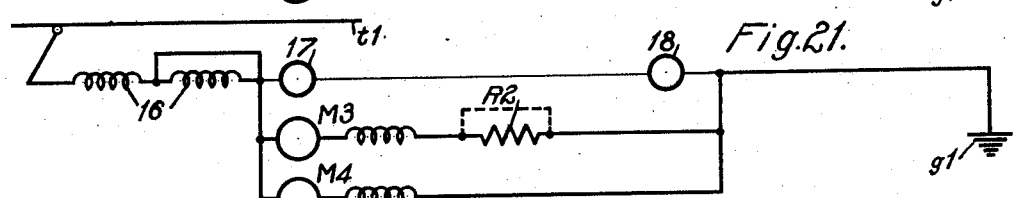

In position $r$, the switch 19 is released and the motors M3 and M4 are connected in parallel across the line circuit, the resistor R2 being included in the circuit of the motor M3, as is illustrated by the full lines in Fig. 21 of the drawings. In position $s$, which is the final running position, the resistor R2 is excluded from the circuit of the motor M3 by means of the switch 35 and a circuit is completed, as is illustrated by the dotted lines in Fig. 21 of the drawings. In this way full supply-circuit voltage is applied to the motors.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a supply circuit, and means for generating different voltages lower than that of said supply circuit, comprising a dynamo-electric machine having a plurality of armature windings, of a plurality of motors connected in series relation, means for connecting said armature windings in parallel relation to the respective motors and means for subsequently connecting the motors in parallel relation.

2. In a system of control, the combination with a supply circuit and a dynamo-electric machine provided with two armature windings for supplying currents of different voltages, of a pair of motors connected in series relation, means for connecting said armature windings in parallel relation to the respective motors, and means for subsequently connecting the motors in parallel relation across the higher-voltage armature winding.

In testimony whereof, I have hereunto subscribed my name this 22nd day of Sept. 1916.

RUDOLF E. HELLMUND.